(12) United States Patent
Kim et al.

(10) Patent No.: US 12,483,098 B2
(45) Date of Patent: Nov. 25, 2025

(54) POWER SUPPLY OF A VEHICLE MOTOR HAVING AN ELASTIC MEMBER WITH A COUPLING PORTION

(71) Applicants: HYUNDAI MOTOR COMPANY, Seoul (KR); KIA CORPORATION, Seoul (KR)

(72) Inventors: Tae Won Kim, Seoul (KR); Chan Hyeok Lee, Hwaseong-si (KR); Yo Sub Sim, Seongju-gun (KR); Jae Eun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 278 days.

(21) Appl. No.: 18/136,702

(22) Filed: Apr. 19, 2023

(65) Prior Publication Data
US 2024/0006966 A1 Jan. 4, 2024

(30) Foreign Application Priority Data
Jul. 4, 2022 (KR) .......................... 10-2022-0081591

(51) Int. Cl.
H02K 3/50 (2006.01)
H02K 5/22 (2006.01)
H02K 11/30 (2016.01)

(52) U.S. Cl.
CPC ............. H02K 11/30 (2016.01); H02K 3/50 (2013.01); H02K 5/225 (2013.01); H02K 2203/09 (2013.01)

(58) Field of Classification Search
CPC ............ H02K 3/50; H02K 5/22; H02K 5/225; H02K 5/24; H02K 2203/09
See application file for complete search history.

(56) References Cited

U.S. PATENT DOCUMENTS

2003/0006666 A1   1/2003  Mimura
2007/0052307 A1*  3/2007  Yoshida ................ H02K 5/225
                                                    310/179
(Continued)

FOREIGN PATENT DOCUMENTS

CN    113708577 A  * 11/2021
JP    2007209177 A    8/2007
(Continued)

OTHER PUBLICATIONS

Sato, Machine Translation of JP2008079465, Apr. 2008 (Year: 2008).*
(Continued)

Primary Examiner — Eric Johnson
(74) Attorney, Agent, or Firm — Lempia Summerfield Katz LLC

(57) ABSTRACT

A power supply of a motor for a vehicle includes: a terminal block mounted to a motor housing to prevent disconnection of a terminal connection portion configured to supply power to a stator coil of the motor; a terminal plate electrically connected to the terminal block; a bus bar provided on the terminal plate; a stator coil having a conductive connection terminal electrically connected to the bus bar; and an elastic member mounted to the bus bar and the conductive connection terminal to reduce vibration applied to the bus bar and the conductive connection terminal.

8 Claims, 5 Drawing Sheets

(56) References Cited

U.S. PATENT DOCUMENTS

| | | | |
|---|---|---|---|
| 2016/0294240 A1 | | 10/2016 | Kawamoto et al. |
| 2019/0165643 A1 | | 5/2019 | Jung |
| 2022/0014065 A1 | * | 1/2022 | Seo .......................... H02K 3/50 |
| 2023/0318397 A1 | * | 10/2023 | Geiling ................... H02K 5/04 |

FOREIGN PATENT DOCUMENTS

| | | | | |
|---|---|---|---|---|
| JP | 2008079465 A | * | 4/2008 | |
| JP | 2015122880 A | * | 7/2015 | |
| KR | 101028638 B1 | | 4/2011 | |
| KR | 20110040573 A | | 4/2011 | |
| KR | 20160003717 U | * | 10/2016 | |
| KR | 102238845 B1 | | 4/2021 | |
| WO | WO-2022122087 A1 | * | 6/2022 | .............. B60T 13/74 |

OTHER PUBLICATIONS

Machine Translation of KR20160003717, Oct. 2016 (Year: 2016).*
Qui, Machine Translation of CN113708577, Nov. 2021 (Year: 2021).*
Hoshaku, Machine Translation of JP2015122880, Jul. 2015 (Year: 2015).*

* cited by examiner

- Prior Art -

- Prior Art -

POWER SUPPLY OF A VEHICLE MOTOR HAVING AN ELASTIC MEMBER WITH A COUPLING PORTION

CROSS-REFERENCE TO RELATED APPLICATION

This application claims, under 35 U.S.C. § 119(a), the benefit of and priority to Korean Patent Application No. 10-2022-0081591, filed on Jul. 4, 2022, the entire contents of which are incorporated herein by reference.

BACKGROUND

(a) Technical Field

The present disclosure relates to a power supply of a motor for a vehicle. More particularly, the present disclosure relates to a power supply of a motor for a vehicle designed to easily prevent disconnection of a terminal connection portion configured to supply power to a stator coil of the motor.

(b) Background Art

Generally, an eco-friendly vehicle such as an electric vehicle, a hybrid vehicle, or a fuel cell vehicle is equipped with a traction motor such as a synchronous motor or an induction motor as a driving source for traveling or driving.

Such a motor, in general, essentially includes a motor housing, a stator portion, and a rotor portion, among other components. The stator portion has a stator coil wound on a stator core in which a plurality of steel plates is stacked. The rotor portion has an output shaft coupled to a rotor core in which a plurality of steel plates is stacked.

In addition, the motor further includes a power supply mounted between the motor housing and the stator coil to supply power to the stator coil.

FIG. 1 is a schematic view illustrating the related art power supply of a motor.

As illustrated in FIG. 1, a motor housing 10 has mounted thereon a terminal block 20 for connection to an external power source. The motor housing 10 has an inner portion provided with a stator coil 40 from which a conductive connection terminal 42 extends. The conductive connection terminal 42 is a starting end and a finishing end of the coil.

In addition, because the stator coil 40 has mounted thereon a terminal plate electrically connected to the terminal block 20, the terminal plate 30 is provided with a bus bar 32 electrically connected to the conductive connection terminal 42.

Here, the bus bar 32 of the terminal plate 30 may be brought into close contact with the conductive connection terminal 42 of the stator coil 40 and may be welded thereto to have a welded portion 50 therebetween. Thus, the bus bar 32 may be electrically connected to the conductive connection terminal 42.

With this configuration, an external power source (e.g., battery power) is supplied from the terminal block 20 to the terminal plate 30. Then the external power source is supplied to the stator coil 40 through the bus bar 32 and the conductive connection terminal 42 that are connected to each other by the welded portion 50 to thereby drive the motor.

However, the related art power supply of the motor has the following problems.

Because vibration due to high-speed driving of the motor is continuously applied to the bus bar 32 and the conductive connection terminal 42 that are connected to each other by the welded portion 50, cracks or fractures occur in the welded portion 50 as illustrated in FIG. 2. This can cause disconnection between the bus bar 32 and the conductive connection terminal 42 and the disconnection between the bus bar 32 and the conductive connection terminal 42 hinders power supply to the stator coil 40.

More specifically, a difference in behavior between the motor housing and the stator portion occurs due to the vibration caused by high-speed driving of the motor. Thus, an excitation direction acting on the bus bar 32 of the terminal plate connected to the terminal block 20 that is mounted on the motor housing 10 and an excitation direction acting on the conductive connection terminal 42 extending from the stator coil 40 of the stator portion become different from each other. Accordingly, the welded portion 50 welded between the bus bar 32 and the conductive connection terminal 42 is weakened. Eventually, cracks or fractures occur in the welded portion 50, thereby disconnecting the bus bar 32 from the conductive connection terminal 42. The disconnection between the bus bar 32 and the conductive connection terminal 42 hinders power supply to the stator coil 40.

The above information disclosed in this Background section is only to enhance understanding of the background of the disclosure. Therefore, the Background section may contain information that does not form the prior art that is already known to a person of ordinary skill in the art.

SUMMARY OF THE DISCLOSURE

The present disclosure has been made in an effort to solve the above-described problems associated with the prior art. It is an object of the present disclosure to provide a power supply of a motor for a vehicle having a structure in which an elastic member that reduces vibration is mounted on a bus bar of a terminal plate and a conductive connection terminal of a stator coil that are electrically connected to each other. This can easily prevent the bus bar and the conductive connection terminal from being disconnected from each other due to vibration.

In one aspect, the present disclosure provides a power supply of a motor for a vehicle. The power supply includes: a terminal block mounted to a motor housing; a terminal plate having a bus bar electrically connected to the terminal block; a stator coil having a conductive connection terminal electrically connected to the bus bar; and an elastic member mounted to the bus bar and the conductive connection terminal. The arrangement reduces vibration applied to the bus bar and the conductive connection terminal. The arrangement may include a plurality of the bus bars connected one to one to a plurality of the conductive connection terminals and may include a plurality of the elastic members, one for each of the connected bus bars and terminals.

In an embodiment, the elastic member may be made of a rubber material and may have a structure to cover the circumferential portions of the bus bar of the terminal plate and the conductive connection terminal of the stator coil.

In another embodiment, the elastic member may be made of a rubber material and may have a press-fitting groove formed therein and having one side open to insert thereinto both the bus bar of the terminal plate and the conductive connection terminal of the stator coil.

In still another embodiment, the bus bar and the conductive connection terminal may be inserted into the press-fitting groove in a state in which the bus bar and the conductive connection terminal are electrically connected to each other by a welded portion.

In yet another embodiment, the press-fitting groove in the elastic member may have opposed or opposite walls each having a support rib protruding therefrom and closely supported by the bus bar and the conductive connection terminal.

In still yet another embodiment, the elastic member may have an upper outer circumference having a mounting end protruding therefrom and mounted on the upper surface of the terminal plate. The mounting end may have a lower portion serving as a coupling portion inserted into the terminal plate.

In a further embodiment, the bus bar may be positioned in the terminal plate at a position having a coupling hole formed therein. The coupling portion of the elastic member may be inserted into the coupling hole.

In another further embodiment, the mounting end may have a bottom surface to which an adhesive member for bonding with the terminal plate is attached.

Other aspects and embodiments of the inventive concepts are discussed below.

It is to be understood that the terms "vehicle" or "vehicular" or other similar terms as used herein are inclusive of motor vehicles in general. Such motor vehicles may encompass passenger automobiles including sport utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of embodiments of the present disclosure, as disclosed herein, including, for example, specific dimensions, orientations, locations, and shapes, will be determined in part by the particular intended application and usage environment.

In the figures, the same reference numbers refer to the same or equivalent parts of the present disclosure throughout the several figures of the drawings.

DETAILED DESCRIPTION

Hereinafter, embodiments of the present disclosure are described with reference to the accompanying drawings.

Figure 1:
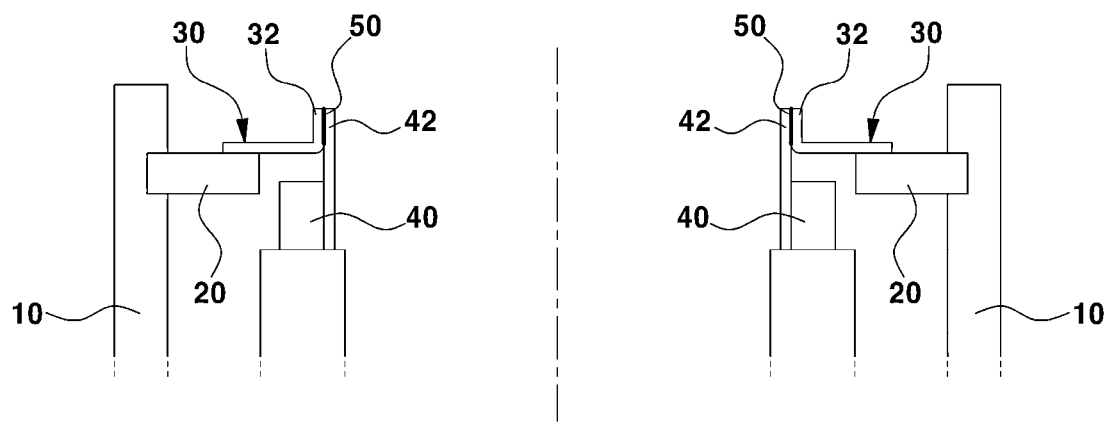
FIG. 1 is a schematic view illustrating a related art power supply of a motor.
Figure 2:
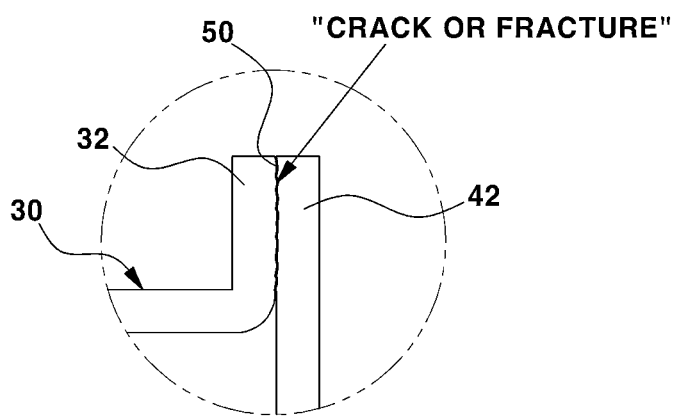
FIG. 2 is a schematic view illustrating that cracks or fractures occur in a welded portion between a bus bar of a terminal plate and a conductive connection terminal of a stator coil in the structure of the related art power supply of a motor.
Figure 3:
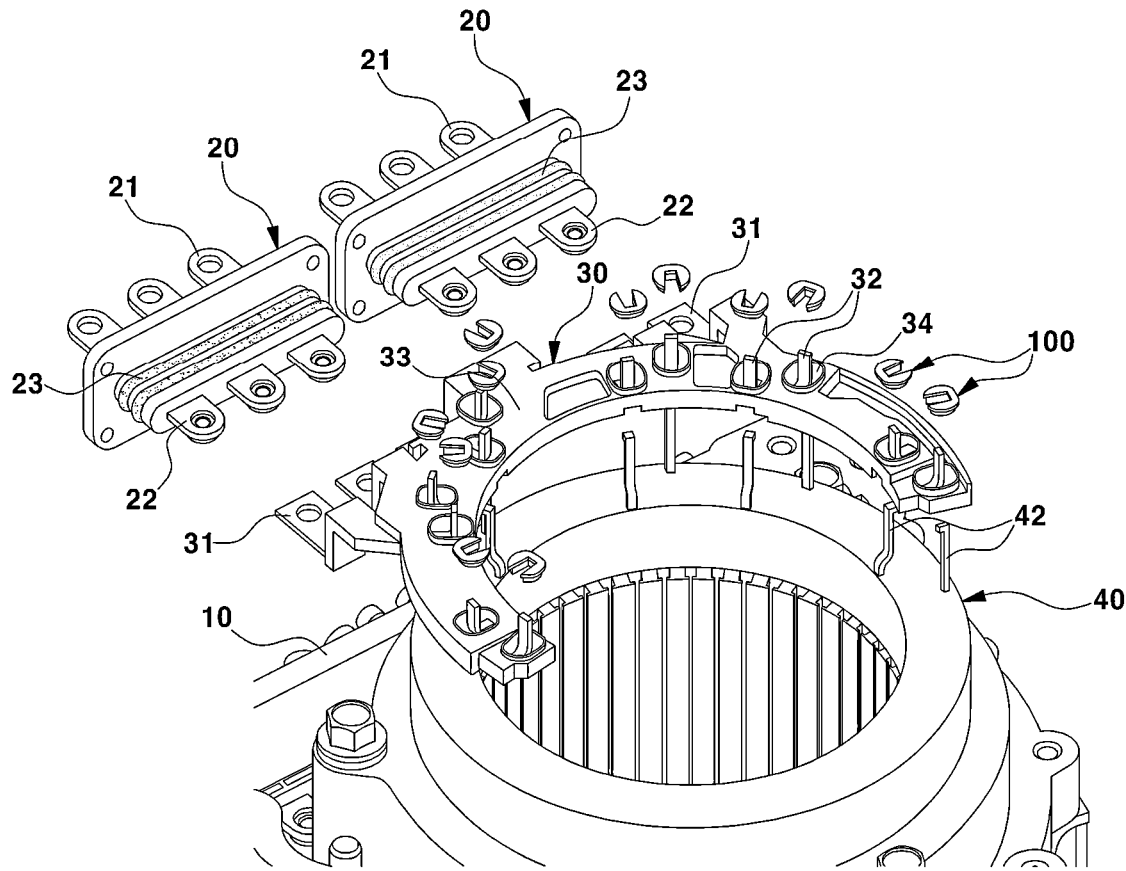
FIG. 3 is an exploded perspective view illustrating a power supply of a motor for a vehicle according to the present disclosure.

FIG. 3 is an exploded perspective view illustrating a power supply of a motor for a vehicle according to the present disclosure.

As illustrated in FIG. 3, a motor housing 10 has a terminal block 20 mounted thereon for connection to an external power source. The motor housing 10 has an inner portion provided with a stator coil 40 to which a terminal plate 30 is mounted.

The terminal block 20 may include a first terminal 21 for connection to an external power source, a second terminal 22 for a conductive connection to the terminal plate 30, and an insulation block 23 molded to be insulated on a portion at which the first terminal 21 and the second terminal 22 are connected to each other.

The terminal plate 30 may include a connection terminal 31 for a conductive connection to the second terminal 22 of the terminal block 20. The terminal plate 30 may also include a plurality of bus bars 32 branching from the connection terminal 31 and an insulation plate 33 molded to be insulated on a portion at which the connection terminal 31 and the bus bar 32 are connected to each other.

Here, the second terminal 22 of the terminal block 20 is connected to the connection terminal 31 of the terminal plate 30, and as such, the terminal block 20 is electrically connected to the terminal plate 30.

In addition, for a conductive connection between the terminal plate 30 and the stator coil 40, the terminal plate 30 has the plurality of bus bars 32, and the stator coil 40 has a plurality of conductive connection terminals 42, each of which is a starting end and a finishing end of the coil, extending vertically.

Accordingly, each of the bus bars 32 of the terminal plate 30 may be brought into close contact with each of the conductive connection terminals 42 of the stator coil 40 and welded thereto to have a welded portion 50 between each connected bus bar 32 and terminal 42. Thus, the bus bars 32 may be electrically connected to the conductive connection terminals 42.

With this configuration, an external power source (e.g., battery power) is supplied from the terminal block 20 to the terminal plate 30, and then is supplied to the stator coil 40 through the bus bars 32 and the conductive connection terminals 42 that are connected to each other by the welded portion 50 to thereby drive the motor.

According to the present disclosure, an elastic member 100 is mounted on each of the connected bus bars 32 and conductive connection terminals 42 in a state in which the bus bar 32 of the terminal plate 30 and the conductive connection terminal 42 of the stator coil 40 are electrically connected to each other.

The elastic member 100 may be made of a rubber material and may have a structure to cover the circumferential portions of the bus bar 32 of the terminal plate and the conductive connection terminal 42 of the stator coil 40 to reduce the same from vibration.

Figure 4A:
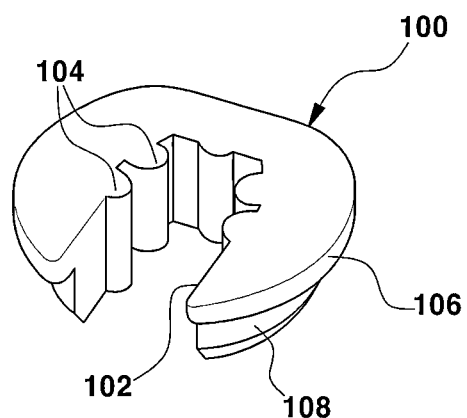
FIGS. 4A and 4B are perspective views each illustrating an elastic member of a power supply of a motor for a vehicle according to the present disclosure.
Figure 4B:
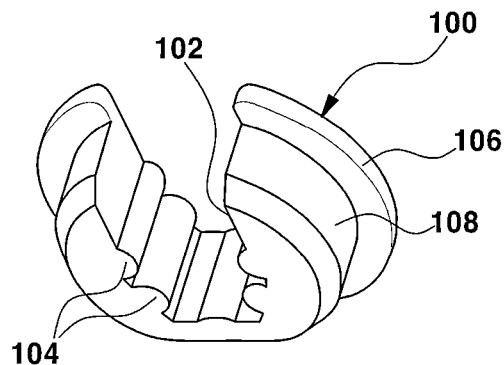

FIGS. 4A and 4B are perspective views each illustrating the elastic member of the power supply according to the present disclosure.

As illustrated in FIGS. 4A and 4B, the elastic member 100 may be made of a rubber material and may have a press-fitting groove 102 formed therein. The press-fitting groove 102 may have one side that is open to insert therein both the bus bar 32 of the terminal plate 30 and the conductive connection terminal 42 of the stator coil 40.

Here, the welded portion 50 is formed by a welding operation in a portion where the bus bar 32 and the conductive connection terminal 42 are in close contact with each other. Thus, the bus bar 32 and the conductive connection terminal 42 are inserted into the press-fitting groove 102 in the elastic member 100 in a state in which the bus bar 32 and the conductive connection terminal 42 are electrically connected to each other by the welded portion 50.

The press-fitting groove 102 in the elastic member 100 has opposite or opposed walls that each have a support rib 104 integrally protruding therefrom and closely supported by the circumferential portions of the bus bar 32 and the conductive connection terminal 42.

Figure 5:
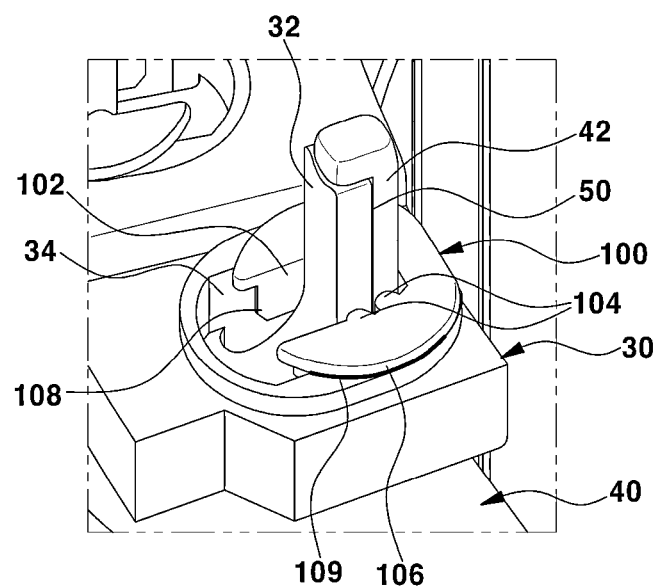
FIG. 5 is a perspective view of a main portion illustrating a state in which an elastic member is mounted on a bus bar and a conductive connection terminal of a power supply of a motor for a vehicle according to the present disclosure.

Accordingly, as illustrated in FIG. 5, when the bus bar 32 and the conductive connection terminal 42 are inserted into the press-fitting groove 102 in the elastic member 100, the circumferential portions of the bus bar 32 and the conductive connection terminal 42 are closely supported by the support ribs 104 formed on the opposing walls of the press-in groove 102.

Because the bus bar 32 and the conductive connection terminal 42 are inserted into the press-fitting groove 102 in the elastic member 100 and are closely supported by the support ribs 104, the elastic member 100 may reduce vibration applied to the bus bar 32 and the conductive connection terminal 42. Also, even when vibration is transmitted to the bus bar 32 and the conductive connection terminal 42, the bus bar 32 and the conductive connection terminal 42 may not move in different directions but may move in the same direction.

Further, the elastic member 100 may have an upper outer circumference having a mounting end 106 protruding therefrom and mounted on the upper surface of the terminal plate 30. The mounting end 106 may have a lower portion serving as a coupling portion 108 and which is to be inserted into the terminal plate 30.

As illustrated in FIG. 5, a portion where the bus bar 32 is positioned on the terminal plate 30 may have a coupling hole 34 formed therein and into which the coupling portion 108 of the elastic member 100 is inserted.

With this configuration, when the coupling portion 108 of the elastic member 100 is inserted into the coupling hole 34 in the terminal plate 30, the elastic member 100 may be fixed to the terminal plate 30 while surrounding the bus bar 32 and the conductive connection terminal 42.

The mounting end 106 of the elastic member 100 may have a bottom surface to which an adhesive member 109, such as a double-sided tape or adhesive for bonding with the terminal plate 30, is further attached.

Accordingly, when the coupling portion 108 of the elastic member 100 is inserted into the coupling hole 34 in the terminal plate 30, the mounting end 106 is brought into close contact with the upper surface of the terminal plate 30 and is adhered to the same by the adhesive member 109. This allows the elastic member 100 to be more firmly fixed to the terminal plate 30 while surrounding the bus bar 32 and the conductive connection terminal 42.

Further, the elastic member 100 may be integrated with the insulation plate 33 of the terminal plate 30 when the terminal plate 30 is fabricated.

Here, the operation flow of the power supply of the present disclosure having the above-described configuration is as follows.

First, an external power source (e.g., battery power) is supplied from the terminal block 20 to the terminal plate 30. The external power source then is supplied to the stator coil 40 through the bus bar 32 and the conductive connection terminal 42 that are connected to each other by the welded portion 50 to thereby drive the motor.

Here, after the motor is driven, the motor may be excited by vibration caused by high-speed driving of the motor. The motor may be excited in a first radial direction (X-direction) or a second radial direction (Z-direction) perpendicular to an axial direction (Y-direction). Accordingly, a difference in behavior between the motor housing 10 and the stator coil 40 may occur, thereby continuously applying vibration to the bus bar 32 and the conductive connection terminal 42.

More specifically, the bus bar 32 is connected to the side of the motor housing 10 by the terminal block 20 and the terminal plate 30 and the conductive connection terminal 42 is integrally extended from the stator coil 40. Because of this arrangement, when vibration is continuously applied to the bus bar 32 and the conductive connection terminal 42, the excitation direction acting on the bus bar 32 and the excitation direction acting on the conductive connection terminal 42 become different from each other. Thus, the welded portion 50 between the bus bar 32 and the conductive connection terminal 42 may be weakened by the force of the bus bar 32 and the conductive connection terminal 42 moving in different directions.

However, according to the present disclosure, the bus bar 32 and the conductive connection terminal 42 are inserted into the press-fitting groove 102 in the elastic member 100, as illustrated in FIG. 5. Because of this arrangement, when the motor is excited in the first radial direction (X-direction) or the second radial direction (Z-direction) that is perpendicular to the axial direction (Y-direction) and vibration is applied to the bus bar 32 and the conductive connection terminal 42, the vibration applied to the bus bar 32 and the conductive connection terminal 42 may be easily reduced in the elastic member 100.

Moreover, the circumferential portions of the bus bar 32 and the conductive connection terminal 42 are inserted into the press-fitting groove 102 in the elastic member 100 and closely supported by the support rib 104, as illustrated in FIG. 5. Because of this arrangement, when the motor is excited in the first radial direction (X-direction) or in the second radial direction (Z-direction) that are different from each other and are perpendicular to the axial direction (Y-direction), the bus bar 32 and the conductive connection terminal 42 may not move in different directions but may move in the same direction even when vibration is transmitted to the bus bar 32 and the conductive connection terminal 42.

As such, the elastic member 100 exerts a damping force in a shear direction with respect to the welded portion 50 interconnecting the bus bar 32 and the conductive connection terminal 42. Concentration of stress is thereby prevented in the welded portion 50 due to vibration or the like. Also, cracks or fractures in the welded portion 50 are also prevented. Thus, durability of the electrical connection is ensured, i.e., in a state in which the bus bar 32 and the conductive connection terminal 42 are conductively bonded to each other by the welded portion 50.

To elaborate, when the motor is excited in the first radial direction (X-direction) and the second radial direction (Z-direction) that are different from each other, the elastic member 100 reduces the vibration applied to the bus bar 32 and the conductive connection terminal 42. At the same time, the elastic member 100 guides the bus bar 32 and the conductive connection terminal 42 to move in the same direction. This prevents concentration of stress in the welded portion 50 due to vibration or the like and prevents cracks or fractures in the welded portion 50, and ultimately ensures the durability of the electrical connection in a state in which the bus bar 32 and the conductive connection terminal 42 are conductively bonded to each other by the welded portion 50.

As a test example of the present disclosure, an excitation test was performed on a bus bar and a conductive connection terminal in a state in which the elastic member 100 was not mounted thereon. For comparison, an excitation test was also performed on a bus bar 32 and a conductive connection terminal 42 in a state in which the elastic member 100 was mounted thereon.

Figure 6:
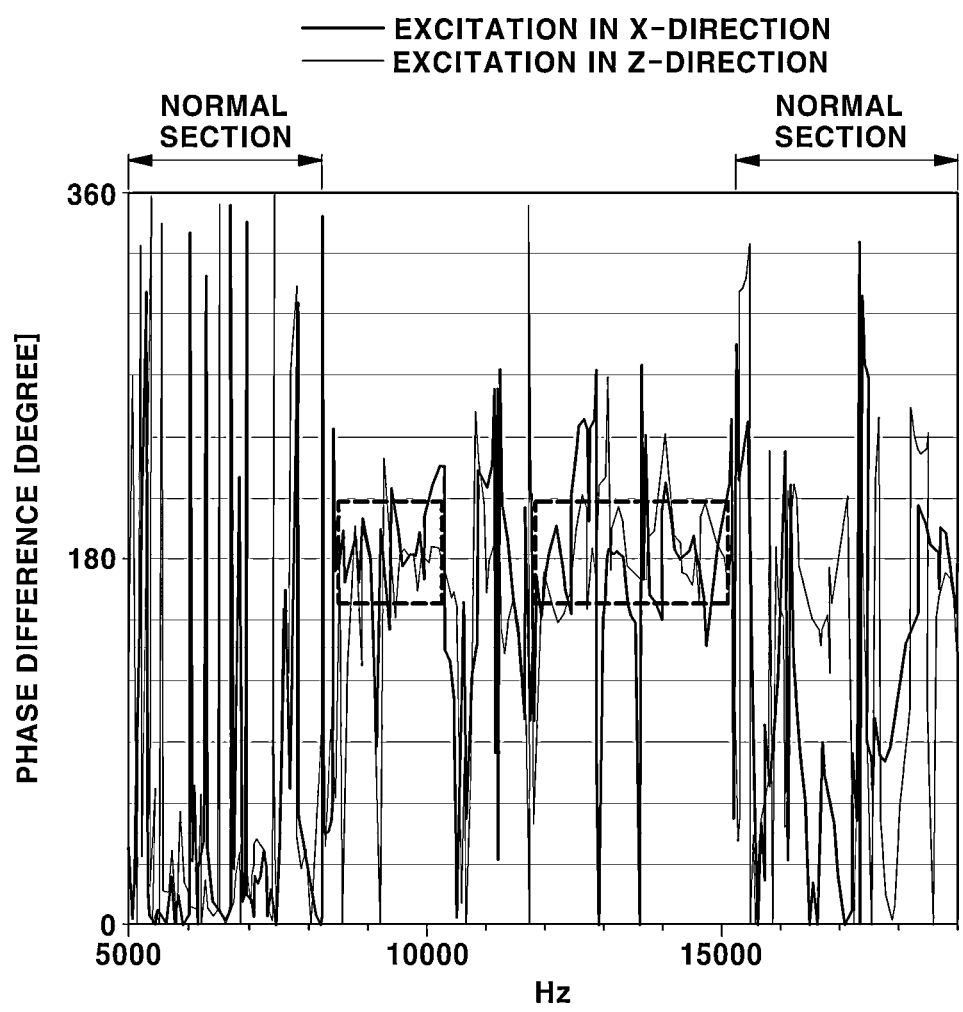
FIG. 6 is a graph showing the result of an excitation test for a bus bar and a conductive connection terminal in a state in which an elastic member is not mounted thereon.
Figure 7:
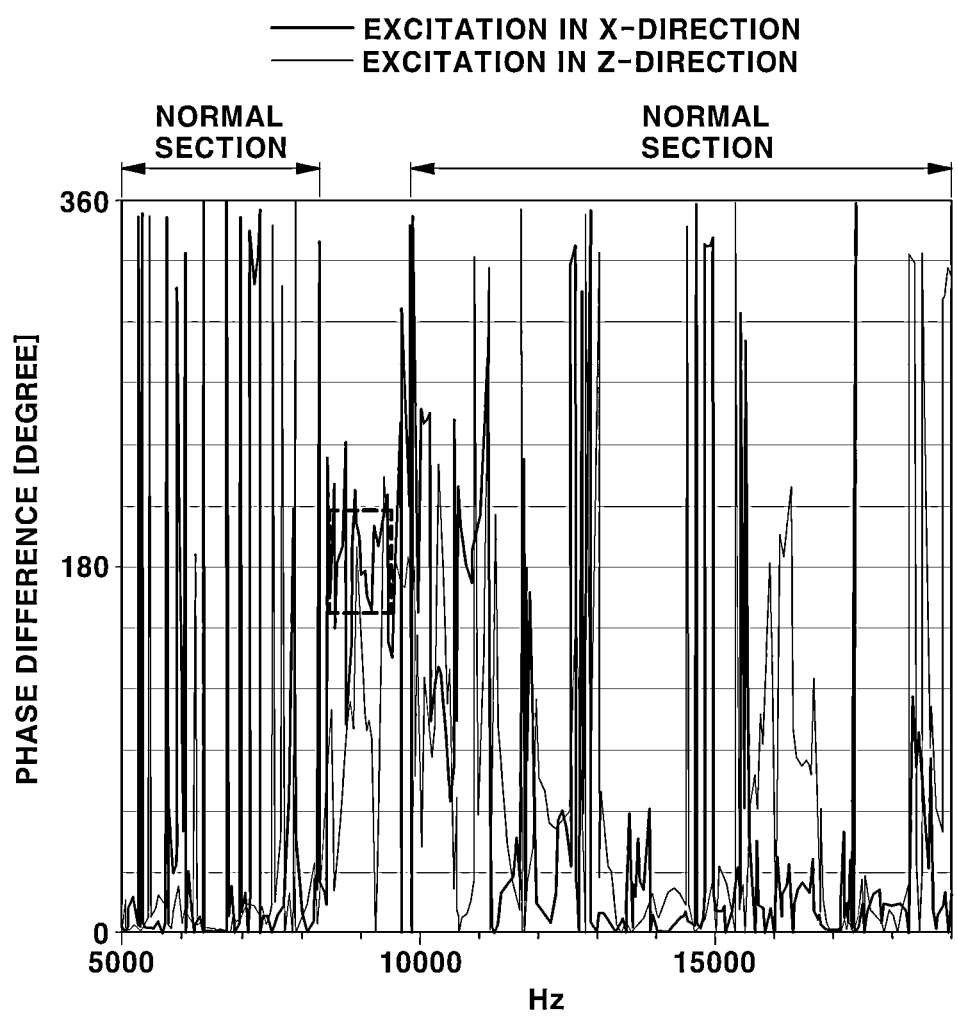
FIG. 7 is a graph showing the result of an excitation test for a bus bar and a conductive connection terminal in a state in which an elastic member of a power supply of a motor for a vehicle according to the present disclosure is mounted thereon.

FIG. 6 shows the result of the excitation test for the bus bar and the conductive connection terminal in the state in which the elastic member is not mounted thereon. FIG. 7 shows the result of the excitation test for the bus bar and the conductive connection terminal in the state in which the elastic member according to the present disclosure is mounted thereon.

When the motor is excited in the first radial direction (X-direction) and in the second radial direction (Z-direction) in the state in which the elastic member is not mounted thereon, it is normal that the bus bar and the conductive connection terminal move together in the excitation direction and exhibit a large phase difference over the range of 0 to 360 degrees, as indicated by the normal section in FIG. 6. However, as indicated by the dotted line box in FIG. 6, it was found that the bus bar and the conductive connection terminal try to move in different directions in a predetermined frequency section and a small phase difference occurs near 180 degrees for more than a predetermined period of time.

When the bus bar and the conductive connection terminal try to move in different directions for a predetermined period of time in a predetermined frequency section as described above, the welded portion between the bus bar and the conductive connection terminal becomes weak, and thus cracks or fractures may occur.

Conversely, when the motor is excited in the first radial direction (X-direction) and in the second radial direction (Z-direction) in the state in which the elastic member 100 is mounted thereon, the bus bar 32 and the conductive connection terminal 42 move together in the excitation direction in most frequency ranges and exhibit a large phase difference over the range of 0 to 360 degrees, as indicated by the normal section in FIG. 7. Particularly, as indicated by the dotted line box in FIG. 7, it was found that the bus bar 32 and the conductive connection terminal 42 try to move in different directions in a predetermined frequency section and a small phase difference temporarily occurs near 180 degrees for less than a predetermined period of time.

As described above, even when the bus bar 32 and the conductive connection terminal 42 temporarily try to move in different directions in a predetermined frequency section, the elastic member 100 provides certain advantages. The elastic member 100 reduces the vibration applied to the bus bar 32 and the conductive connection terminal 42. At the same time, the elastic member 100 guides the bus bar 32 and the conductive connection terminal 42 to move in the same direction, thereby preventing cracks or fractures in the welded portion 50. Ultimately, the elastic member 100 ensures durability of the electrical connection, i.e., in a state in which the bus bar 32 and the conductive connection terminal 42 are conductively bonded to each other by the welded portion 50.

As is apparent from the above description, the present disclosure provides the following effects.

First, an elastic member made of a rubber material is mounted on a bus bar of a terminal plate and a conductive connection terminal of a stator coil that are electrically connected to each other to reduce vibration caused by high-speed driving of a motor. This prevents disconnection between the bus bar of the terminal plate and the conductive connection terminal of the stator coil.

Second, the elastic member made of a rubber material covers the bus bar and the conductive connection terminal in a state in which the bus bar of the terminal plate and the conductive connection terminal of the stator coil are electrically connected to each other by a welded portion to reduce the vibration caused by high-speed driving of the motor. This prevents cracks or fractures in the welded portion between the bus bar and the conductive connection terminal and, ultimately, ensures conductive bonding between the bus bar and the conductive connection terminal.

The inventive concepts of the present disclosure have been described in detail with reference to embodiments thereof. However, it should be appreciated by those having ordinary skill in the art that changes may be made in these embodiments without departing from the principles and spirit of the disclosure, the scope of which is defined in the appended claims and equivalents thereto.

What is claimed is:

1. A power supply of a motor for a vehicle, the power supply comprising:
   a terminal block mounted to a motor housing;
   a terminal plate having a bus bar electrically connected to the terminal block;
   a stator coil having a conductive connection terminal electrically connected to the bus bar; and
   an elastic member mounted to the bus bar and the conductive connection terminal,
   wherein the elastic member has an upper outer circumference having a mounting end protruding therefrom and mounted on an upper surface of the terminal plate, and
   wherein the mounting end has a lower portion serving as a coupling portion inserted into the terminal plate.

2. The power supply according to claim 1, wherein the elastic member is made of a rubber material and has a structure to cover circumferential portions of the bus bar of the terminal plate and the conductive connection terminal of the stator coil.

3. The power supply according to claim 1, wherein the elastic member is made of a rubber material and has formed therein a press-fitting groove having one side open to insert both the bus bar of the terminal plate and the conductive connection terminal of the stator coil therein.

4. The power supply according to claim 3, wherein the bus bar and the conductive connection terminal are inserted into the press-fitting groove of the elastic member in a state in which the bus bar and the conductive connection terminal are electrically connected to each other by a welded portion.

5. The power supply according to claim 3, wherein the press-fitting groove in the elastic member has opposed walls each having a support rib protruding therefrom and closely supported by the bus bar and the conductive connection terminal.

6. The power supply according to claim 1, wherein the bus bar is positioned in the terminal plate at a position having a coupling hole formed therein, and wherein the coupling portion of the elastic member is inserted into the coupling hole.

7. The power supply according to claim 1, wherein the mounting end has a bottom surface to which an adhesive member for bonding with the terminal plate is attached.

8. The power supply according to claim 1, further comprising:
- a plurality of the bus bars;
- a plurality of the conductive connection terminals, each terminal of the plurality of conductive connection terminals being connected to a corresponding bus bar of the plurality of bus bars; and
- a plurality of the elastic members, one each mounted to each corresponding bus bar and terminal.

* * * * *